(12) United States Patent
Kremeier et al.

(10) Patent No.: US 12,465,707 B2
(45) Date of Patent: Nov. 11, 2025

(54) SYSTEM FOR VENTILATION OF A BEING

(71) Applicant: Loewenstein Medical Technology S.A., Luxembourg (LU)

(72) Inventors: Peter Kremeier, Karlsruhe (DE); Christian Woll, Oetigheim (DE)

(73) Assignee: LOEWENSTEIN MEDICAL TECHNOLOGY S.A., Luxembourg (LU)

( * ) Notice: Subject to any disclaimer, the term of this patent is extended or adjusted under 35 U.S.C. 154(b) by 686 days.

(21) Appl. No.: 17/457,455

(22) Filed: Dec. 3, 2021

(65) Prior Publication Data

US 2022/0176052 A1 Jun. 9, 2022

(30) Foreign Application Priority Data

Dec. 7, 2020 (DE) .......................... 102020007506.1
Dec. 8, 2020 (DE) .......................... 102020007492.8

(51) Int. Cl.
  *A61M 16/00* (2006.01)
  *G16H 20/40* (2018.01)

(52) U.S. Cl.
  CPC .......... *A61M 16/024* (2017.08); *G16H 20/40* (2018.01); *A61M 2230/42* (2013.01); *A61M 2230/65* (2013.01)

(58) Field of Classification Search
  CPC ....... A61M 16/024–026; A61B 5/0033; A61B 5/0036; A61B 5/0536
  See application file for complete search history.

(56) References Cited

U.S. PATENT DOCUMENTS

| | | | |
|---|---|---|---|
| 11,291,786 B2 * | 4/2022 | Truschel | A61M 16/04 |
| 2016/0354007 A1 | 12/2016 | Garber | |
| 2018/0078168 A1 | 3/2018 | Garber | |
| 2019/0015614 A1 * | 1/2019 | Alahmadi | A61B 5/082 |
| 2019/0038173 A1 * | 2/2019 | Gärber | A61B 5/0871 |
| 2020/0016352 A1 * | 1/2020 | Stender | A61B 5/6823 |
| 2020/0221970 A1 * | 7/2020 | Stender | A61B 5/085 |
| 2020/0324067 A1 | 10/2020 | Kremeier et al. | |
| 2021/0016035 A1 * | 1/2021 | Euliano | A61B 5/4848 |
| 2023/0346252 A1 * | 11/2023 | Nakamura | A61B 5/087 |

FOREIGN PATENT DOCUMENTS

| | | |
|---|---|---|
| DE | 102015006902 B3 | 6/2016 |
| DE | 102016011161 A1 | 3/2018 |
| DE | 102017007224 A1 | 2/2019 |
| DE | 102020002279 A1 | 10/2020 |

* cited by examiner

*Primary Examiner* — Kendra D Carter
*Assistant Examiner* — Jaeick Jang
(74) *Attorney, Agent, or Firm* — Abel Schillinger, LLP

(57) ABSTRACT

A system for ventilation of a being, comprising at least one ventilator and at least one EIT measuring device, the ventilator comprising at least one controllable respiratory gas source and a programmable control unit for controlling the respiratory gas source and the EIT measuring device comprising at least one sensor apparatus for measuring impedance values of at least one lung of the being and at least one calculation and evaluation unit, and the system assigning the impedance values measured by way of the at least one sensor apparatus to pixels n, and the control unit being configured as specified in the claims.

14 Claims, 5 Drawing Sheets

SYSTEM FOR VENTILATION OF A BEING

CROSS-REFERENCE TO RELATED APPLICATIONS

The present application claims priority under 35 U.S.C. § 119 of German Patent Application No. 10 2020 007 506.1, filed Dec. 7, 2020, and of German Patent Application No. 10 2020 007 492.8, filed Dec. 8, 2020, the entire disclosures of which are expressly incorporated by reference herein.

BACKGROUND OF THE INVENTION

1. Field of the Invention

The invention relates to a system for ventilation of a being.

2. Discussion of Background Information

EIT (electrical impedance tomography) allows spatially differentiated information to be ascertained in relation to the state of a lung. EIT is a noninvasive method, in which weak AC currents flow through the body and voltages are generated at the surface in the process. Within the scope of EIT, the surface voltages or conductivities are measured on the body, which depend on the impedances or the distribution thereof within for example the thorax. Pixels are recorded in the process; in this case, each pixel reproduces an electrical conductivity or impedance. The measured impedance is predominantly determined by the intrapulmonary air content, it is thus also possible to draw conclusions about the state of the pulmonary alveoli in certain regions of the lung. This method offers the possibility of detecting fast physiological changes on account of the high time resolution. The evaluation of the EIT measurement signals and the conversion into images is the subject matter of numerous scientific publications (cf. Lionheart, W.R.B. in Physiological Measurement 2004, 25, 1 and Schullcke, B. in Scientific Reports, 2016, 6, page 25951ff). Further general details can also be gathered from DE 10 2013 203177 A1, for example. The entire disclosures of the just mentioned documents and of the documents mentioned below are incorporated by reference herein.

Moreover, finding suitable settings of the positive end-expiratory pressure (PEEP) with the aid of EIT measurements has been disclosed in the prior art. Thus Costa et al. (Costa, E.L. in Intensive Care Med 2009; 35, pages 1132-1137) showed how suitable settings of the PEEP can be found by changing the PEEP incrementally and simultaneously carrying out EIT measurements. Since this process is time-consuming it only comes into question at the beginning of a ventilation in particular. The requirement of the being may change over the ventilation period and, particularly in the field of medicine, there often remains insufficient time to apply this process more frequently.

It would be therefore advantageous, for the aforementioned reasons, to have available a system for analyzing an effective and reliable ventilation of a being.

SUMMARY OF THE INVENTION

The present invention provides a system for ventilation of a being, comprising at least one ventilator and at least one EIT measuring device, the ventilator comprising at least one controllable respiratory gas source and a programmable control unit for controlling the respiratory gas source and the EIT measuring device comprising at least one sensor apparatus for measuring impedance values of at least one lung of the being and at least one calculation and evaluation unit, the system assigning the impedance values measured by way of the at least one sensor apparatus to pixels n, the control unit being configured a. to specify ventilation settings in a reference phase R of the respiratory gas source, impedance values being recorded at at least one point in time in the reference phase and a first characteristic $C_{R,n}$ being calculated from the recorded impedance values for each pixel n, and b. to specify ventilation settings in at least one test phase T1 of the respiratory gas source following the reference phase R, the ventilation settings differing from the ventilation settings of the reference phase in at least one ventilation setting and impedance values being recorded at at least one point in time in the test phase T1 and a second characteristic $C_{T1,n}$ being calculated from the recorded impedance values for each pixel n.

In some embodiments of the system, at least one further test phase Tm follows the at least one test phase T1, the ventilation setting of each further test phase Tm differing from the first test phase T1 and the reference phase R in at least one ventilation setting and the system recording impedance values at at least one point in time in each further test phase Tm and calculating a second characteristic $C_{Tm,n}$ from the recorded impedance values for each pixel n.

In some embodiments of the system, only one test phase follows the reference phase R.

In some embodiments of the system, both the reference phase and each test phase comprise at least two breaths, the reference phase and each test phase being able to be subdivided into at least two subphases, at least one subphase representing a habituation phase and at least one subphase representing a measurement phase.

In some embodiments of the system, a positive end-expiratory pressure (PEEP) is applied during the expiration phase of each breath, and an inspiratory pressure $P_{insp}$ that is higher by the value ΔP or a tidal volume VT that is higher by a specified factor is applied during the inspiration phase.

In some embodiments of the system, an end-expiratory hold maneuver is carried out at the end of at least one expiration phase, the end-expiratory hold maneuver comprising holding the PEEP and, where necessary, ascertaining the intrinsic PEEP (PEEPi).

In some embodiments of the system, an end-inspiratory hold maneuver is carried out at the end of at least one inspiration phase, the end-inspiratory hold maneuver comprising holding the inspiratory pressure $P_{insp}$ and, where necessary, ascertaining the plateau level and/or a surrogate for static compliance.

In some embodiments of the system, the end-expiratory hold maneuver and the end-inspiratory hold maneuver are carried out during the measurement phase.

In some embodiments of the system, the measurement phase comprises at least two breaths, the end-expiratory hold maneuver being carried out during the expiration phase of the second-to-last breath and the end-inspiratory hold maneuver being carried out during the inspiration phase of the last breath.

In some embodiments of the system, impedance values are recorded and assigned to pixels n at at least two points in time both during the reference phase R and during the test phase T1, the first point in time being during the end-expiratory hold maneuver and the recorded impedance values being assigned to the pixels n as $I_{Min,n}$, and the second point in time being during the end-inspiratory hold maneuver and the recorded impedance values being assigned to the pixels n as $I_{Max,n}$.

In some embodiments of the system, the following values are calculated from the respective values $I_{Min,n}$ and $I_{Max,n}$, in each case for the reference phase and the test phase:
  a. $\Delta I_n$ for each pixel n as the difference between $I_{Max,n}$ and $I_{Min,n}$,
  b. $I_{Min,Sum}$ as the sum of all $I_{Min,n}$,
  c. $I_{Max,Sum}$ as the sum of all $I_{Max,n}$,
  d. $\Delta I_{global}$ as the difference between $I_{Max,Sum}$ and $I_{Min,Sum}$, wherein the calculation for the respective pixel is only carried out and the pixel is only included in the sums $I_{Max,Sum}$ and $I_{Min,Sum}$ if $\Delta I_n > 0$ applies to the pixel.

In some embodiments of the system, the respective characteristics $C_{R,n}$ and $C_{T1,n}$ of the reference and test phase, respectively, are each calculated from the ratio of $\Delta I_n$ to $\Delta I_{global}$, where
  a. the ratio $\Delta I_n$ to $\Delta I_{global}$ of the reference phase is multiplied by a factor $C_{R,Stat}$ in order to calculate $C_{R,n}$ and
  b. the ratio $\Delta I_n$ to $\Delta I_{global}$ of the test phase is multiplied by a factor $C_{T1,Stat}$ in order to calculate $C_{T1,n}$, and where $C_{R,Stat}$ and $C_{T1,Stat}$ are determined from the pressure difference between the end-expiratory hold maneuver and the end-inspiratory hold maneuver and also the expiration volume of the breath preceding the breath during which the end-expiratory hold maneuver is carried out.

In some embodiments of the system, the characteristic $C_{T1,n}$ of each pixel n is compared to the characteristic $C_{R,n}$ of the same pixel n and the pixel n is assigned to one of at least two numerical groups.

In some embodiments of the system
  a. the pixels n for which $C_{T1,n}$ is greater than $C_{R,n}$ are assigned to a first numerical group WIN and
  b. the pixels n for which $C_{T1,n}$ is less than $C_{R,n}$ are assigned to a second numerical group LOSS.

In some embodiments of the system, a characteristic is calculated from the characteristics $C_{T1,n}$ and $C_{R,n}$ for each pixel n of the respective numerical group, wherein
  a. a characteristic $C_{WIN,n}$ is calculated for the pixels n from the numerical group WIN and
  b. a characteristic $C_{LOSS,n}$ is calculated for the pixels n from the numerical group LOSS.

In some embodiments of the system, a global characteristic is calculated in each case for each numerical group WIN and LOSS with the sum of the respective characteristics $C_{WIN,n}$ and $C_{LOSS,n}$, respectively, wherein
  a. a characteristic $C_{WIN,global}$ is calculated for the numerical group WIN with the sum of the characteristics $C_{WIN,n}$ and
  b. a characteristic $C_{LOSS,global}$ is calculated for the numerical group LOSS with the sum of the characteristics $C_{LOSS,n}$.

In some embodiments of the system, the characteristics $C_{WIN,global}$ and $C_{LOSS,global}$ are interpreted and the magnitude of the characteristics is output in alphanumeric and/or graphical fashion.

In some embodiments of the system, the ventilation setting by which the reference phase and the test phase T1 differ from one another is included in the interpretation of the characteristics.

In some embodiments of the system, a notification is generated on the basis of the interpretation of the characteristics $C_{WIN,global}$ and $C_{LOSS,global}$, the notification containing at least one recommendation in respect of the ventilation settings and the notification being output in alphanumeric and/or graphical fashion.

In some embodiments of the system, at least one of $\Delta P$ and/or PEEP and/or a tidal volume can be set as the ventilation setting which differs between reference phase and test phase.

In some embodiments of the system, in the case of a PEEP setting which is elevated in the test phase T1 in relation to the reference phase,
  a. the recommendation not to alter the ventilation settings is output if $C_{WIN,global}$ and $C_{LOSS,global}$ are below the set threshold,
  b. the recommendation to increase the PEEP is output if $C_{WIN,global}$ is above the set threshold and $C_{LOSS,global}$ is below the set threshold,
  c. the recommendation not to alter the PEEP and consider a reduction in the inspiratory pressure $P_{insp}$ and/or the expiratory tidal volume VT, wherein a test phase with reduced inspiratory pressure $P_{insp}$ should initially be set, is output if $C_{WIN,global}$ is below the set threshold and $C_{LOSS,global}$ is above the set threshold,
  d. the recommendation to increase the PEEP and consider a reduction in the inspiratory pressure $P_{insp}$ and/or expiratory tidal volume VT, wherein a test phase with reduced inspiratory pressure $P_{insp}$ should initially be set, is output if $C_{WIN,global}$ and $C_{LOSS,global}$ are above the set threshold.

In some embodiments of the system, in the case of a PEEP setting which is reduced in the test phase T1 in relation to the reference phase,
  a. the recommendation not to alter the ventilation settings is output if $C_{WIN,global}$ and $C_{LOSS,global}$ are below the set threshold,
  b. the recommendation to reduce the PEEP is output if $C_{WIN,global}$ is above the set threshold and $C_{LOSS,global}$ is below the set threshold,
  c. the recommendation not to alter the setting of the PEEP and to consider a recruitment maneuver is output if $C_{WIN,global}$ is below the set threshold and $C_{LOSS,global}$ is above the set threshold,
  d. the recommendation not to alter the setting of the PEEP and to consider a recruitment maneuver and, where possible, to reduce $P_{insp}$ and/or VT is output if $C_{WIN,global}$ and $C_{LOSS,global}$ are above the set threshold.

In some embodiments of the system, in the case of a $P_{insp}$ and/or VT setting which is elevated in the test phase T1 in relation to the reference phase,
  a. the recommendation not to alter the ventilation settings is output if $C_{WIN,global}$ and $C_{LOSS,global}$ are below the set threshold,
  b. the recommendation to increase the PEEP is output if $C_{WIN,global}$ is above the set threshold and $C_{LOSS,global}$ is below the set threshold,
  c. the recommendation to reduce the setting of the PEEP and/or of the $P_{insp}$ and/or of VT is output if $C_{WIN,global}$ is below the set threshold and $C_{LOSS,global}$ is above the set threshold,
  d. the recommendation to increase the PEEP and, where possible, to reduce the $P_{insp}$ and/or the tidal volume is output if $C_{WIN,global}$ and $C_{LOSS,global}$ are above the set threshold.

In some embodiments of the system, in the case of a $P_{insp}$ and/or VT setting which is reduced in the test phase T1 in relation to the reference phase, a. the recommendation not to alter the ventilation settings is output if $C_{WIN,global}$ and $C_{LOSS,global}$ are below the set threshold,
b. the recommendation to reduce the PEEP and/or $P_{insp}$ and/or VT is output if $C_{WIN,global}$ is above the set threshold and $C_{LOSS,global}$ is below the set threshold,
c. the recommendation to increase the PEEP is output if $C_{WIN,global}$ is below the set threshold and $C_{LOSS,global}$ is above the set threshold,
d. the recommendation to increase the PEEP and, where possible, to reduce the $P_{insp}$ and/or the tidal volume is output if $C_{WIN,global}$ and $C_{LOSS,global}$ are above the set threshold.

In some embodiments of the system, findings are established on the basis of the interpretation of the characteristics $C_{WIN,global}$ and $C_{LOSS,global}$.

In some embodiments of the system, the notification also contains at least one finding in addition to the recommendation.

In some embodiments of the system, in the case of a PEEP setting which is elevated in the test phase (T1) in relation to the reference phase (R),
a. findings that no significant changes were determined are established if $C_{WIN,global}$ and $C_{LOSS,global}$ are below the set threshold,
b. findings that there will be recruitment if the PEEP is increased are established if $C_{WIN,global}$ is above the set threshold and $C_{LOSS,global}$ is below the set threshold,
c. findings that there will be a hyperexpansion as a result of increasing the PEEP are established if $C_{WIN,global}$ is below the set threshold and $C_{LOSS,global}$ is above the set threshold,
d. findings that there will be both recruitment and a hyperexpansion as a result of increasing the PEEP are established if $C_{WIN,global}$ and $C_{LOSS,global}$ are above the set threshold.

In some embodiments of the system, in the case of a PEEP setting which is reduced in the test phase (T1) in relation to the reference phase (R),
a. findings that no significant changes were determined are established if $C_{WIN,global}$ and $C_{LOSS,global}$ are below the set threshold,
b. findings that a weakening hyperexpansion can be observed are established if $C_{WIN,global}$ is above the set threshold and $C_{LOSS,global}$ is below the set threshold,
c. findings that derecruitment can be observed are established if $C_{WIN,global}$ is below the set threshold and $C_{LOSS,global}$ is above the set threshold,
d. findings that both a weakening hyperexpansion and derecruitment can be observed are established if $C_{WIN,global}$ and $C_{LOSS,global}$ are above the set threshold.

In some embodiments of the system, in the case of a $P_{insp}$ and/or VT setting which is elevated in the test phase (T1) in relation to the reference phase (R),
a. findings that no significant changes can be observed are established if $C_{WIN,global}$ and $C_{LOSS,global}$ are below the set threshold,
b. findings that the suspicion of tidal recruitment can be observed are established if $C_{WIN,global}$ is above the set threshold and $C_{LOSS,global}$ is below the set threshold,
c. findings that hyperexpansion can be observed are established if $C_{WIN,global}$ is below the set threshold and $C_{LOSS,global}$ is above the set threshold,
d. findings that a hyperexpansion can be observed are established if $C_{WIN,global}$ and $C_{LOSS,global}$ are above the set threshold.

In some embodiments of the system, in the case of a $P_{insp}$ and/or VT setting which is reduced in the test phase (T1) in relation to the reference phase (R),
a. findings that no significant changes can be observed are established if $C_{WIN,global}$ and $C_{LOSS,global}$ are below the set threshold,
b. findings that a weakening hyperexpansion can be observed are established if $C_{WIN,global}$ is above the set threshold and $C_{LOSS,global}$ is below the set threshold,
c. findings that the suspicion of tidal recruitment can be observed are established if $C_{WIN,global}$ is below the set threshold and $C_{LOSS,global}$ is above the set threshold,
d. findings that a weakening hyperexpansion and a suspicion of tidal recruitment can be observed are established if $C_{WIN,global}$ and $C_{LOSS,global}$ are above the set threshold.

In some embodiments of the system, output recommendations are automatically carried out and corresponding ventilation settings are implemented.

The invention further provides a system for ventilation of a being, comprising at least one ventilator and at least one EIT measuring device, the ventilator comprising at least one controllable respiratory gas source and a programmable control unit for controlling the respiratory gas source and the EIT measuring device comprising at least one sensor apparatus for measuring impedance values of at least one lung of the being and at least one calculation and evaluation unit, the system assigning the impedance values measured by way of the at least one sensor apparatus to pixels n, the system being configured to carry out the following method steps:
a. habituating the being to ventilation settings in a reference phase R,
b. measuring impedances of the lung of the being during the reference phase R,
c. habituating the being to ventilation settings in a test phase T1,
d. measuring impedances of the lung of the being during the test phase T1,
e. calculating characteristics $C_{R,n}$ and $C_{T1,n}$ from the impedance values from the measurement step,
f. comparing the characteristics $C_{R,n}$ and $C_{T1,n}$,
g. classifying the characteristics $C_{R,n}$ and $C_{T1,n}$ in numerical groups WIN and LOSS,
h. calculating characteristics $C_{WIN,global}$ and $C_{LOSS,global}$,
i. comparing the characteristics $C_{WIN,global}$ and $C_{LOSS,global}$ to thresholds,
j. evaluation, the evaluation at least comprising the generation of a graphical representation of the characteristics $C_{WIN,global}$ and $C_{LOSS,global}$ and the evaluation step (113) optionally comprising the establishment of findings taking into account the characteristics $C_{WIN,global}$ and $C_{LOSS,global}$,
k. recommendation, the recommendation at least comprising the generation of an alphanumeric output of recommendations in respect of the ventilation settings.

The invention further provides a method for ventilation of a being using a system for ventilation of a being, comprising at least one ventilator and at least one EIT measuring device, the ventilator comprising at least one controllable respiratory gas source and a programmable control unit for controlling the respiratory gas source and the EIT measuring device comprising at least one sensor apparatus for measuring impedance values of at least one lung of the being and at least one calculation and evaluation unit, the system assigning the impedance values measured by way of the at least one sensor apparatus to pixels n, the control unit a. specifying ventilation settings in a reference phase R of the respiratory gas source, impedance values being recorded at at least one point in time in the reference phase and a first characteristic $C_{R,n}$ being calculated from the recorded impedance values for each pixel n, and b. specifying ventilation settings in at least one test phase T1 of the respiratory gas source following the reference phase R, the ventilation settings differing from the ventilation settings of the reference phase in at least one ventilation setting and impedance values being recorded at at least one point in time in the test phase T1 and a second characteristic $C_{T1,n}$ being calculated from the recorded impedance values for each pixel n.

Attention should be drawn to the fact that the features listed individually in the claims can be combined with one another in any technically expedient fashion and indicate further configurations of the invention. The description additionally characterizes and specifies the invention, particularly in conjunction with the figures.

Further attention should be drawn to the fact that an "and/or" conjunction, which is used herein, found between two features and links these, should always be interpreted such that only the first feature may be present in a first configuration of the subject matter of the invention, only the second feature may be present in a second configuration, and both the first and the second feature may be present in a third configuration.

A ventilator should be understood to mean any device which assists a user or patient with natural respiration, which takes over the ventilation of the user or patient and/or which serves for respiratory therapy and/or otherwise influences the respiration of the user or patient. By way of example, without being an exhaustive list, these include CPAP and BiPAP devices, anaesthesia devices, respiratory therapy devices, (clinical, outpatient or emergency) ventilators, high flow therapy devices and cough machines. Ventilators can also be understood to mean diagnostic devices for the ventilation. In general, diagnostic devices in this case may serve to record medical parameters of a patient. This also includes devices which can record and optionally process medical parameters of patients in combination with or only in relation to respiration.

Unless expressly described otherwise, a patient interface can be understood to mean any part or any connected peripheral devices of the ventilator which is designed for interaction with a patient, in particular for therapeutic or diagnostic purposes. In particular, a patient interface can be understood to be a tracheal cannula, a mask of a ventilator or a mask connected to the ventilator. The mask can be a full face mask, i.e., a mask surrounding nose and mouth, or a nose mask, i.e., a mask only surrounding the nose. Tracheal tubes and what are known as nasal cannulas can also be used as a mask. In some cases, the patient interface can also be a simple mouthpiece, for example a tube, through which the being at least exhales.

The measuring device according to the invention is not only suitable, in particular, for use in the field of therapy and ventilation of patients, but can moreover also find use in other fields where assistance of the natural respiration may be desirable, for example for divers, mountaineers, in the protective equipment of firefighters, etc. The measuring device according to the invention can also find use in the field of determining various physiological parameters of a being—not only in view of diagnostics.

BRIEF DESCRIPTION OF THE DRAWINGS

In the following text, the system according to the invention is described in more detail in exemplary fashion on the basis of FIGS. 1 to 5. In these figures.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

The steps, calculations and recommendations described below can be expressly also carried out, at least in part, by for instance evaluation, calculation and/or control units of the ventilator 2. In particular the calculations, evaluations, interpretations, outputs and/or recommendations assigned in exemplary fashion to the EIT measuring device 3 may be undertaken in identical fashion and/or in slightly modified fashion by the ventilator 2 and/or generally by the system 1. By way of example, to this end the system 1 comprises at least one superordinate control unit and optionally appropriate calculation and evaluation units. Overall, the system (1) is preferably designed such that all steps, calculations, recommendations, evaluations (including the establishment of findings), interpretations and/or outputs can be carried out automatically. As a rule, all that should be required is that the ventilation settings of the reference phases and test phases are set manually.

Figure 1:
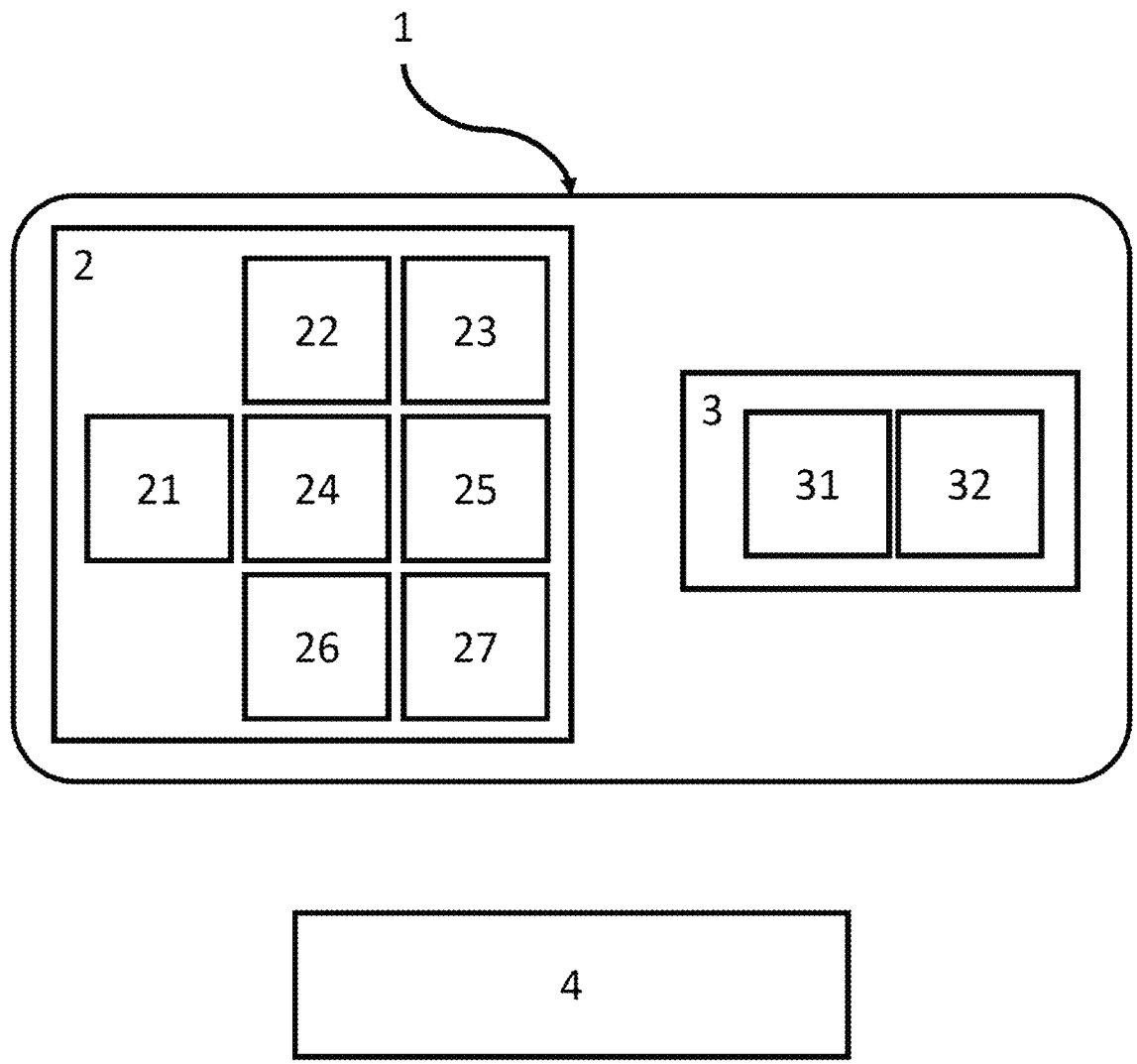
FIG. 1 schematically shows an exemplary embodiment of the system 1 consisting of a ventilator 2 and an EIT measuring device 3.

FIG. 1 schematically shows an exemplary embodiment of the system 1 consisting of a ventilator 2 and an EIT measuring device 3. By way of example, the system 1 is connected to a being 4, the ventilator 1 firstly being connected to the being, for example by way of one or more tubes and patient interface (neither of which is illustrated), in order to convey respiratory gas to the being 4 and optionally from said being. The ventilator comprises at least a controllable respiratory gas source 21, a programmable control unit 22, a sensor unit 23, a memory unit 24, a preparation unit 25, a monitoring unit 26 and a detection unit 27. As a rule, the ventilator 2 moreover also still comprises at least a user interface (not illustrated), which allows at least inputs into the ventilator 2 to be made. Additionally, the ventilator 2 may comprise an indication apparatus or be connected to an indication unit by way of an interface, with data, values, information, notifications, etc. being able to be indicated or output via said indication apparatus or indication unit.

By way of example, the controllable respiratory gas source 21 is designed to convey respiratory gas to the being 4. By way of example, a respiratory gas source 21 can be a fan and/or valve unit, which generates the respiratory gas from the ambient air and/or from gas bottles.

By way of example, the control unit 22 serves to control the ventilator 2, in particular the respiratory gas source 21. To this end, the control unit 22 is designed inter alia to control the ventilation pressure and/or flow generated by the respiratory gas source 21. Additionally, the control unit 22 can be designed to control other constituent parts and/or units of the ventilator 2. In some embodiments, the control unit 22 may also be further subdivided and consist of a plurality of control units, each of which control an individual unit and/or constituent part of the ventilator 2. In particular, the control unit 22 is configured to at least partly automatically control the ventilator 2. In particular, the control unit 22 is programmable in such a way that various maneuvers, during which at least one ventilation setting is altered, are carried out.

The sensor unit 23 is configured to record measurement values, in particular parameters related to a respiratory flow, a respiratory volume, a respiratory rate, an inspiration and expiration duration, a respiratory contour, a leakage or a therapy pressure. Optionally, the sensor unit 23 can carry out additional constituent part or temperature measurements of the respiratory gas or the blood. The sensor unit 23 transmits the recorded measurement values to the memory unit 24.

By way of example, the preparation unit 25 is designed as a combined preparation and calculation unit and can prepare the recorded measurement values. By way of example, the preparation unit 25 can smooth the measurement values, remove artifacts therefrom or carry out downsampling in respect thereof. Further, the preparation unit 25 is embodied to calculate signals and/or characteristics, for example a mean value, a median, a percentile, a derivative, a frequency distribution, a duration or a component of overshooting or undershooting thresholds from the prepared measurement values recorded by the sensor unit 23.

The detection unit 26 is configured to detect events/states such as for example alarms, apnea, artifacts, coughs, oxygen (de)saturations, asynchrony between device and user, and/or spontaneous breaths.

The memory unit 24 inter alia stores, or at least buffer stores, the values/parameters recorded by the sensor unit 23 and/or the values, data and/or information prepared by the preparation unit 25. The information, data and values obtained by the detection unit 26 can be and/or are at least buffer stored in the memory unit. By way of example, a buffer storage means that the values, data and/or information are stored until transmission and then are for example deleted or released to be overwritten.

By way of example, the monitoring unit 27 detects technical problems with the ventilator 2. By way of example, technical problems may include a low battery level, faults in the electronics, a defective rechargeable battery, a defective component, a power outage, an accessory that does not work correctly, an implausible measurement value or a departure from a permitted temperature range. Should a technical problem be detected, the monitoring unit 27 can indicate or transmit an alarm to the ventilator 2 via an interface.

By way of example, the EIT measuring device 3 is connected to the ventilator 2 via an interface (not shown). In some embodiments, the EIT measuring device 3 may also be integrated at least in part into the ventilator 2. The EIT measuring device 3 at least comprises a sensor apparatus 31 and a calculation and evaluation unit 32.

The sensor apparatus 31 comprises a plurality of surface electrodes which are arranged on the skin of the being 4. As a rule, the sensor apparatus comprises at least 4 surface electrodes, with use frequently being made of between 15 and 65 surface electrodes. However, a number of more than 64 surface electrodes is also conceivable. A low-amplitude AC current with a low current intensity (as a rule in the single digit milliampere value range) flows through two of the surface electrodes, for example two adjacent surface electrodes. This AC current is measured by the other surface electrodes, for example in the form of impedance values. By way of example, the EIT measuring device 3 is configured such that the surface electrodes between which the AC current flows change following the measurement, for example to the adjacent two surface electrodes, with this process repeating until, for example, the AC current flows between the first two surface electrodes again. By way of example, this completes a measurement cycle. In some embodiments of the EIT measuring device 3, the current always flows between the two same surface electrodes and is always measured by the same other surface electrodes.

The EIT measuring device 3 is further designed such that, for example via the calculation and evaluation unit 32, the impedance values measured by the sensor apparatus 31 can be assigned to individual pixels. Further, the calculation and evaluation unit 32 is embodied to calculate various characteristics from the impedance values and carry out an evaluation on the basis of the characteristics and, for example, generate recommendations in respect of the ventilation settings, for example regarding the inspiratory pressure $P_{insp}$ and/or the positive end-expiratory pressure PEEP and/or the expiratory tidal volume VT.

By way of example, the system 1 is configured such that the EIT measuring device 3 and/or the ventilator 2 measures impedance values at at least two points in time in a ventilation maneuver carried out by the ventilator 2, evaluates these impedance values or calculates characteristics using the impedance values, and subsequently creates and optionally outputs recommendations regarding the ventilation settings while taking account of the settings of the ventilation maneuver, for example via the indication apparatus of the ventilator 2 or via an interface, via which, for example, a telemonitoring system is connected.

Figure 2:
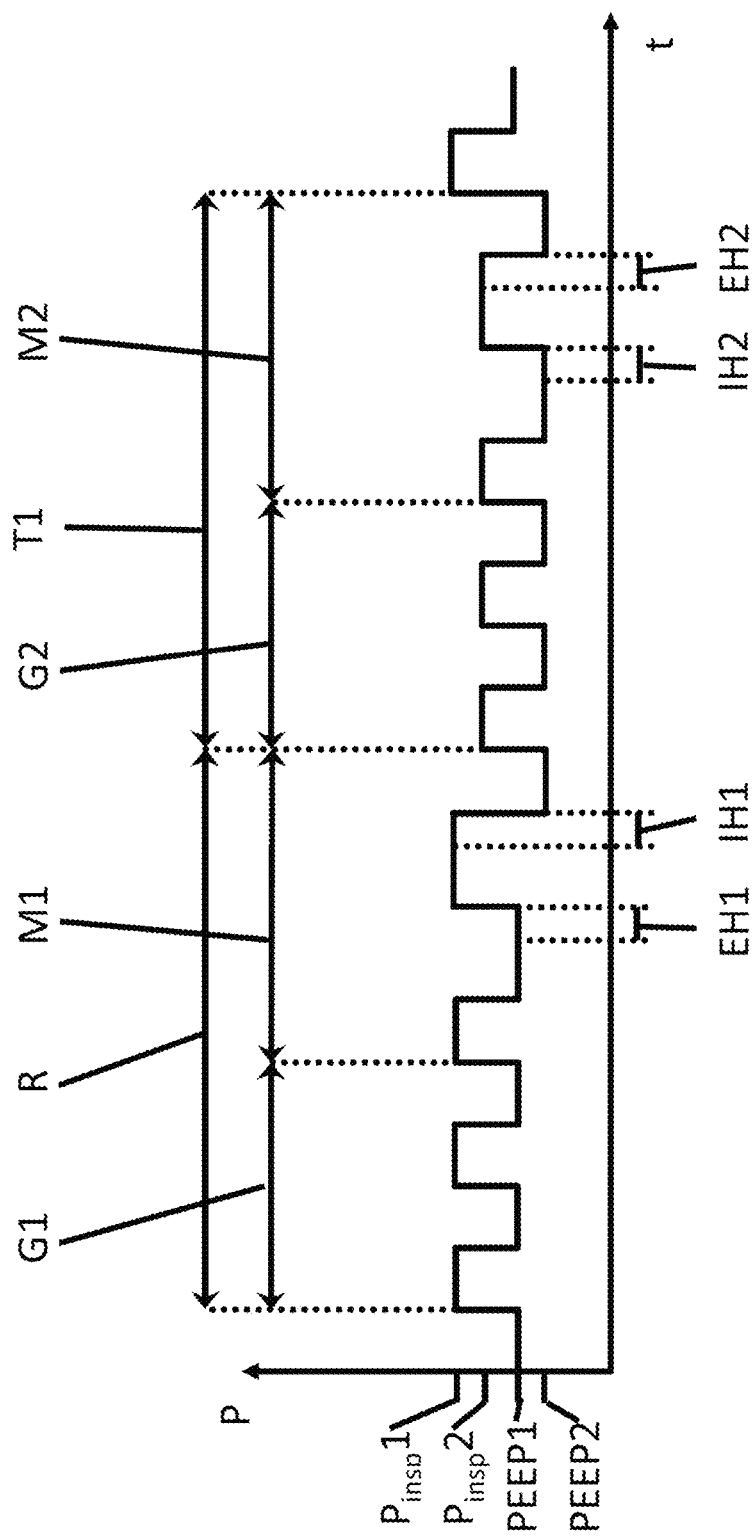
FIG. 2 shows an exemplary sequence of the ventilation maneuver, which can be set on the ventilator 2.
Figure 3:
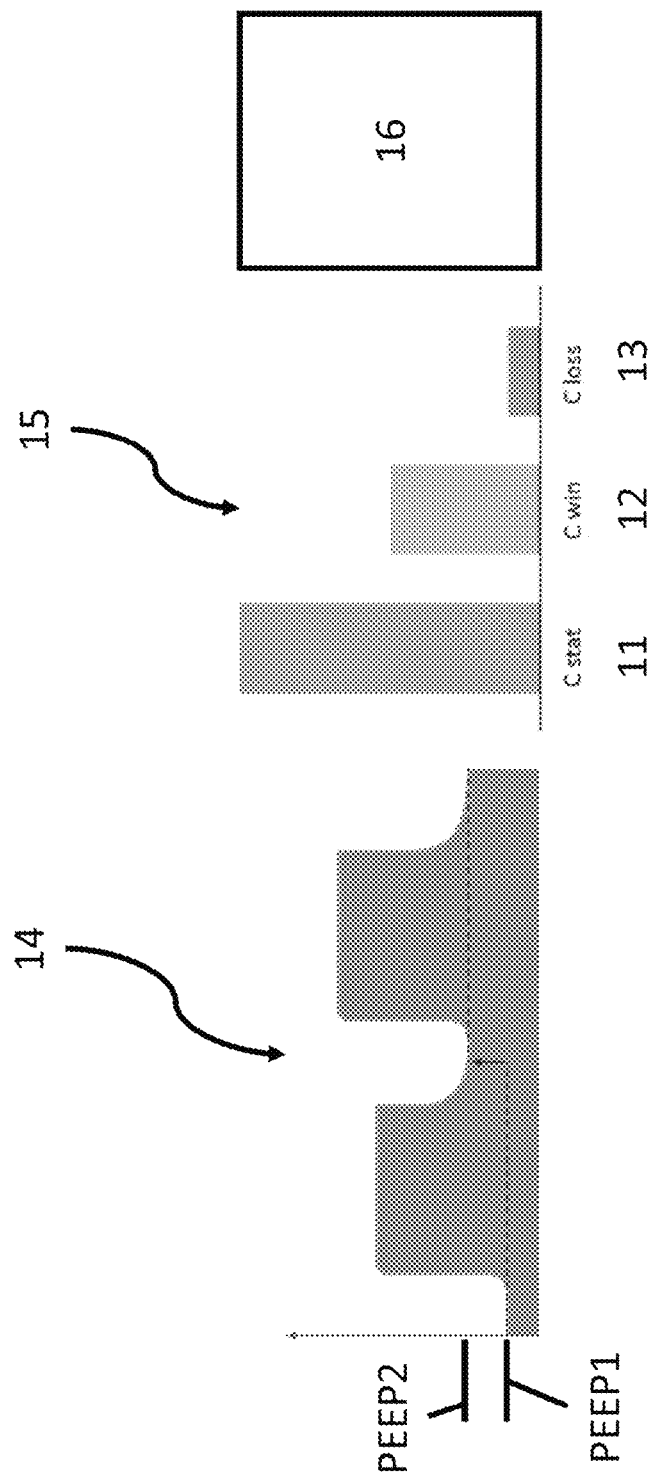
FIG. 3 shows an exemplary embodiment of the alphanumeric and visual output of the evaluation and recommendations of the system 1.
Figure 4:
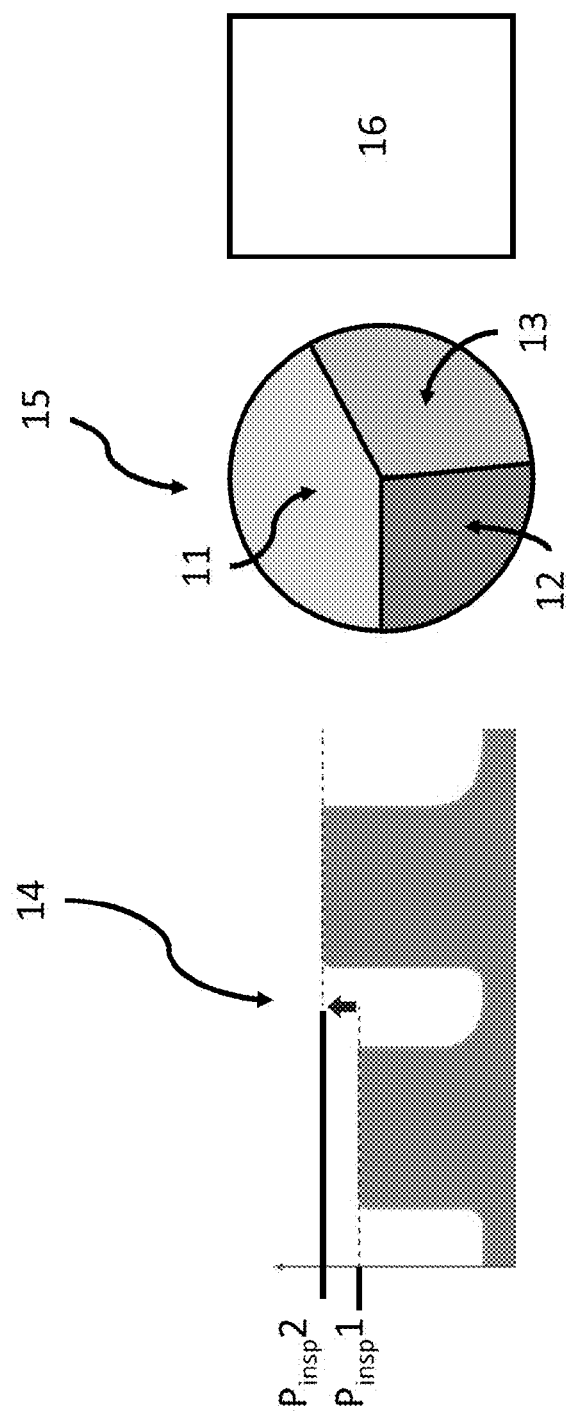
FIG. 4 shows a further exemplary embodiment of the alphanumeric and visual output of the evaluation and recommendations of the system 1.

The ventilation maneuver and the evaluation of the impedance measurements should be explained in exemplary fashion on the basis of FIGS. 2 to 4.

FIG. 2 shows an exemplary sequence of the ventilation maneuver which may be set on the ventilator 2. Here, the x axis y-axis represents the pressure value P and the y-axis x-axis represents the time t. Essentially, the ventilation maneuver is composed of two phases, the reference phase R and a test phase T1. The test phase T1 differs from the reference phase R at least in that one ventilation setting is different. Additionally, further test phases Tm may be set in some embodiments, with each further test phase likewise differing from all other reference phases R and test phases T1, Tm in at least one ventilation setting. In this case, "m" denotes the respective number of the test phase; the second test phase would be accordingly denoted by T2, and so on. By way of example, the reference phase R and the test phase T1 differ in terms of the positive end-expiratory pressure (PEEP) and/or the inspiratory pressure $P_{insp}$. By way of example, which ventilation setting differs between the reference phase R and the test phase T1 and the level of the difference in the ventilation setting can be set on the ventilator 2. By way of example, a reduced PEEP for the test phase T1 (denoted by PEEP2) is provided for the maneuver shown in exemplary fashion in FIG. 2, with the pressure difference ΔP between the PEEP and the inspiratory pressure $P_{insp}$ remaining unchanged, simultaneously having as a consequence that the inspiratory pressure $P_{insp}$ in the test phase T1 (denoted by $P_{insp}2$) is reduced by the same value as the PEEP. An increase in the PEEP can also be set in addition to a reduction in the PEEP. Additionally, a reduction/increase in the pressure difference ΔP (difference between $P_{insp}$ and PEEP) or a reduction/increase by means of a factor of the set tidal volume can be set for the ventilation maneuver, with for example the PEEP being kept constant in the process. In some embodiments it is also possible to set an increase/reduction in the PEEP, with the inspiratory pressure $P_{insp}$ remaining constant, that is to say ΔP being increased/reduced accordingly. During the reference phase R in accordance with the maneuver in FIG. 2, the being 4 is ventilated or assisted with respiration by means of a positive end-expiratory pressure PEEP1 and an inspiratory pressure $P_{insp}1$. In the test phase T1, the PEEP changes with a pressure difference ΔP that remains unchanged in comparison with the reference phase. The being 4 is ventilated or assisted with respiration by means of a positive end-expiratory pressure PEEP2 and an inspiratory pressure $P_{insp}2$.

Each of the phases of the ventilation maneuver comprises a plurality of breaths, the latter consisting of inspiration and expiration. By way of example, a number between 5 and 120, preferably 5 and 60 breaths can be set in each case for the reference phase R and for each of the test phases T1, Tm. Moreover, the reference phase R and the test phase T1 comprise at least two subphases, a habituation phase G1, G2 and a measurement phase M1, M2 in each case. The habituation phase G1, G2 serves to allow the being 4 to habituate to the ventilation settings. The measurement phases M1, M2 follow the respective habituation phase G1, G2 and as a rule comprise two breaths, with the measurement phase M1, M2 also being able to comprise more breaths. Depending on the definition—this is what is considered the start of a breath—the measurement phase may also comprise only a single breath. During the measurement phase M1, M2, impedance values are recorded by the EIT measuring device 3 at at least two points in time, wherein a point in time also can be equated to the time interval required for a measurement cycle of the EIT measuring device 3.

According to the exemplary sequence of the ventilation maneuver illustrated in FIG. 2, an end-expiratory hold maneuver EH1, EH2 is carried out at the end of the expiration of the penultimate breath of the respective reference phase R or test phase T1. Within the scope of the end-expiratory hold maneuver EH1, EH2, the pressure level of the PEEP is maintained at the end of the expiration. The respective first point in time at which the EIT measuring device 3 records or measures the impedance values is during this hold maneuver EH1, EH2.

After the penultimate breath, an inspiratory hold maneuver IH1, IH2 follows the end of the inspiration of the last breath of the respective measurement phase M1, M2, the pressure level of the inspiratory pressure $P_{insp}1$, $P_{insp}2$ being maintained during said inspiratory hold maneuver. In a manner analogous to the expiratory hold maneuvers EH1, EH2, a point in time at which the EIT measuring device 3 measures or records impedance values is during the inspiratory hold maneuver IH1, IH2.

In this case, the length of the hold maneuvers EH1, EH2, IH1, IH2 is adjustable by way of example via the ventilator 2 and/or the EIT measuring device 3. By way of example, the lengths can be set in a range from 0.2 seconds to 8 seconds, with the respective inspiratory hold maneuvers IH1, IH2 being of equal length and the respective expiratory hold maneuvers EH1, EH2 being of equal length. However, the inspiratory hold maneuvers in this case need not have the same length as the expiratory hold maneuvers.

The change in the PEEP, $P_{insp}$ and/or ΔP of the test phase T1 in relation to the reference phase R can also be input by way of example via the ventilator 2 and/or the EIT measuring device 3. By way of example, an absolute change may be entered in mbar and/or else a relative change may be set as a factor.

In some embodiments of the system 1 it is also possible to undertake the settings via a device connected to the system 1 via an interface, for example a telemonitoring unit.

The measured impedance values are to be assigned to individual pixels n, for example by the calculation and evaluation unit 32, with in this case n representing a label, for example continuous numbering, of the pixels. In the case of a total of 1024 pixels, this yields counting for n from 1 to 1024, for example. The calculation and evaluation unit 32 is further designed to assign the impedance values to the pixel in correspondingly unchanged fashion, according to the phase (reference and test phase) and according to the measurement time (EH1, IH1, EH2, IH2). Accordingly, for example at least four impedance values I (respectively one from EH1, IH1, EH2, IH2) are assigned to each pixel after the ventilation maneuver of FIG. 2 has been completed.

Furthermore, the calculation and evaluation unit 32 is designed to calculate in each case from the impedance values of the respective reference or test phase a characteristic $C_{R,n}$ for the reference phase R and a characteristic $C_{T1,n}$ for the test phase T1 for each pixel. To this end, the calculation and evaluation unit 32 initially forms the difference $\Delta I_n$ between $I_{Max,n}$ and $I_{Min,n}$ for each phase R, T1, where $I_{Max,n}$ represents the respective impedance value of the pixel during the measurement during the expiratory hold maneuver EH1 or EH2 and $I_{Min,n}$ represents the respective impedance value of the pixel during the measurement during the inspiratory hold maneuver IH1 or IH2:

$$\Delta I_n = I_{Max,n} - I_{Min,n}$$

In some embodiments, individual pixels are only included further in the calculation and evaluation if $\Delta I_n$ is greater than zero. Further, the difference $\Delta I_{global}$ between $I_{Max,global}$ and $I_{Min,global}$ is formed, where $I_{Max,global}$ represents the sum of the impedance values of all pixels during the measurement during the expiratory hold maneuver EH1 or EH2 and $I_{Min,global}$ represents the sum of the impedance values of all pixels during the measurement during the inspiratory hold maneuver IH1 or IH2:

$$\Delta I_{global} = I_{Max,global} - I_{Min,global} = \sum I_{Max,n} - \sum I_{Min,n}$$

If the value $\Delta I_n$ is less than or equal to zero for a pixel, this pixel is not included in the calculation of $\Delta I_{global}$ either. Thus, each pixel n obtains two values $\Delta I_n$-one for the reference phase R and one for the test phase T1. Likewise, a value $\Delta I_{global}$ is calculated accordingly both for the reference phase R and for the test phase T1. The calculation and evaluation unit 32 subsequently carries out the calculation of the characteristics $C_{R,n}$ and $C_{T1,n}$ for the respective phase R or T1 according to $$C_{R,n} = \frac{\Delta I_n}{\Delta I_{global}} \cdot C_{R,Scat}$$

$$C_{T1,n} = \frac{\Delta I_n}{\Delta I_{global}} \cdot C_{T1,Stat}$$

where the factors $C_{R,Stat}$ and $C_{T1,Stat}$ are calculated from the tidal volume VT ascertained for example by the EIT measuring device 3 or the ventilator 2 and/or from an expiration volume and the pressure difference between the inspiratory hold maneuver IH1 or IH2 and the expiratory hold maneuver EH1 or EH2, and reproduce statistical compliance values. Thus, in relation to FIG. 2, the difference between $P_{insp}1$ and PEEP1 is used for $C_{R,Stat}$ and the difference between $P_{insp}2$ and PEEP2 is used for $C_{T1,Stat}$.

Following the calculation, the characteristics $C_{R,n}$ and $C_{T1,n}$ of the individual pixels are compared to one another and assigned to one of two numerical groups. By way of example, the two numerical groups are labeled WIN and LOSS. The pixels for which $C_{T1,n}$ is greater than $C_{R,n}$ are assigned to the WIN numerical group by the calculation and evaluation unit 32, while the pixels for which $C_{T1,n}$ is less than $C_{R,n}$ are assigned to the LOSS group. A greater value for $C_{T1,n}$ than for $C_{R,n}$ can be considered to be, for example, a compliance win of the individual pixel in the test phase T1 in relation to the reference phase R.

For a further step, the calculation and evaluation unit 32 is designed to calculate a characteristic $C_{WIN,global}$ using the characteristics $C_{R,n}$ and $C_{T1,n}$ of the pixels of the WIN numerical group and to calculate a characteristic $C_{LOSS,global}$ using the characteristics $C_{R,n}$ and $C_{T1,n}$ of the pixels of the LOSS numerical group.

The characteristics $C_{WIN,global}$ and $C_{LOSS,global}$ are calculated in each case by the sum of all characteristics for the compliance win $C_{WIN,n}$ of the pixels of the WIN numerical group multiplied by 100 and by the sum of all characteristics for the compliance loss $C_{LOSS,n}$ of the pixels of the LOSS numerical group multiplied by 100, respectively, and reproduce a global compliance win (WIN) or compliance loss (LOSS) related to the being:

$$C_{WIN,global} = \sum C_{WIN,n} \cdot 100$$

$$C_{LOSS,global} = \sum C_{LOSS,n} \cdot 100$$

Ultimately, the characteristics $C_{WIN,global}$ and $C_{LOSS,global}$ reproduce global compliance wins and losses in percent, for example in relation to the statistical compliance $C_{R,Stat}$. Here, the calculation and evaluation unit 32 calculates the compliance win $C_{WIN,n}$ and the compliance loss $C_{LOSS,n}$ of each individual pixel on the basis of $$C_{WIN,n} = \frac{C_{T1,n} - C_{R,n}}{C_{R,Stat}}$$

$$C_{LOSS,n} = \frac{C_{T1,n} - C_{R,n}}{C_{R,Stat}}$$

using $C_{T1,n}$ and $C_{R,n}$ of the pixels of the respective WIN and LOSS numerical groups.

The characteristics of the global compliance loss $C_{LOSS,global}$ and of the global compliance win $C_{WIN,global}$, in particular, can be used by the calculation and evaluation unit 32 for assessing the ventilation and/or the ventilation settings of the ventilator 2. By way of example, to this end the calculation and evaluation unit 32 checks whether the characteristics $C_{WIN,global}$ and/or $C_{LOSS,global}$ exceed definable thresholds. By way of example, the thresholds can be programmable in the system and cover a range from 1% to 99%, for example in a range from 10% to 50%. In some embodiments, the thresholds can also be set independently of one another. The assessment by the calculation and evaluation unit 32 is implemented in respect of whether any one and which of the characteristics $C_{WIN,global}$ and $C_{LOSS,global}$ reach or exceed the respective threshold. Overall, there are four possible results in this case:

Both $C_{WIN,global}$ and $C_{LOSS,global}$ are below the threshold, $C_{WIN,global}$ is above the threshold and $C_{LOSS,global}$ is below the threshold, $C_{WIN,global}$ is below the threshold and $C_{LOSS,global}$ is above the threshold, $C_{WIN,global}$ and $C_{LOSS,global}$ are above the threshold.

In general, the system 1 is designed to output an alphanumeric and/or graphical evaluation of the characteristics. By way of example, the evaluation or the output of the characteristics can be output in the form of a bar chart, wherein the size of the bar corresponds to the size of the respective characteristic, for example also in relation to the statistical compliance $C_{R,Stat}$. By way of example, a representation as a pie chart is also conceivable.

The system 1 can output recommendations in respect of the ventilation settings using the global compliance losses and wins and using the settings of the ventilation maneuver. To facilitate such a statement, the reference phase R of the ventilation maneuver should correspond to the ventilation settings of the previous ventilation. As already described, the test phase T1 differs from the reference phase R in at least one ventilation setting. Particularly on the basis of this differing ventilation setting, the system 1 is designed to generate and/or output the recommendations in respect of the ventilation settings.

Moreover, the global compliance losses $C_{LOSS,global}$ and compliance wins $C_{WIN,global}$ can also be used to establish findings. Like in the case of the recommendations, the reference phase R of the ventilation maneuver should correspond to the ventilation settings of the previous ventilation in order to facilitate a corresponding establishment of findings. Alternatively, findings are initially also established and the recommendations are generated or output on the basis of these findings in some embodiments.

By way of example, the findings are output in alphanumeric and/or graphical fashion by way of an indication device, for example together with the recommendation in respect of the ventilation settings.

In accordance with the adjustment options for the ventilation maneuver (increase/reduce PEEP, $P_{insp}$, VT, $\Delta P$ with unchanging $P_{insp}$) described in exemplary fashion and with the possible results of the evaluation of the characteristics $C_{WIN,global}$ and $C_{LOSS,global}$, the following recommendation options arise, for example. By way of example, the recommendations are output alphanumerically.

If the PEEP in the test phase T1 is elevated over the PEEP of the reference phase R, a. the recommendation not to change the ventilation settings is output if $C_{WIN,global}$ and $C_{LOSS,global}$ are below the set threshold; moreover, it is possible to establish findings that no significant changes were determined, b. the recommendation to increase the PEEP is output if $C_{WIN,global}$ is above the set threshold and $C_{LOSS,global}$ is below the set threshold; moreover, it is possible to establish findings that there will be recruitment if the PEEP is increased, c. the recommendation not to alter the PEEP and to consider a reduction of $P_{insp}$ and/or VT, wherein the ventilation maneuver including measurements with reduced $P_{insp}$ should initially be carried out in the test phase T1, is output if $C_{WIN,global}$ is below the set threshold and $C_{LOSS,global}$ is above the set threshold; moreover, it is possible to establish findings that there is a hyperexpansion as a result of increasing the PEEP, d. the recommendation to increase the PEEP and to consider a reduction of $P_{insp}$ and/or VT, wherein the ventilation maneuver including measurements with reduced $P_{insp}$ should initially be carried out in the test phase T1, is output if $C_{WIN,global}$ and $C_{LOSS,global}$ are above the set threshold; moreover, it is possible to establish findings that there is both recruitment and a hyperexpansion as a result of increasing the PEEP.

If the PEEP in the test phase T1 is reduced in relation to the PEEP of the reference phase R, a. the recommendation not to change the ventilation settings and/or reduce the PEEP is output if $C_{WIN,global}$ and $C_{LOSS,global}$ are below the set threshold; moreover, it is possible to establish findings that no significant changes were determined, b. the recommendation to reduce the PEEP is output if $C_{WIN,global}$ is above the set threshold and $C_{LOSS,global}$ is below the set threshold; moreover, it is possible to establish findings that a weakening hyperexpansion can be observed, c. the recommendation not to alter the setting of the PEEP and/or to increase the latter and to consider a recruitment maneuver is output if $C_{WIN,global}$ is below the set threshold and $C_{LOSS,global}$ is above the set threshold; moreover, it is possible to establish findings that derecruitment can be observed, d. the recommendation not to alter the setting of the PEEP and to consider a recruitment maneuver and, if possible, reduce $P_{insp}$ and/or VT is output if $C_{WIN,global}$ and $C_{LOSS,global}$ are above the set threshold; moreover, it is possible to establish findings that both a weakening hyperexpansion and a derecruitment can be observed.

If the inspiratory pressure $P_{insp}$ is elevated in the test phase T1 in relation to $P_{insp}$ of the reference phase R, a. the recommendation not to change the ventilation settings is output if $C_{WIN,global}$ and $C_{LOSS,global}$ are below the set threshold; moreover, it is possible to establish findings that no significant changes can be observed, b. the recommendation to increase the PEEP is output if $C_{WIN,global}$ is above the set threshold and $C_{LOSS,global}$ is below the set threshold; moreover, it is possible to establish findings that the suspicion of a tidal recruitment can be observed, c. the recommendation to reduce the setting of the PEEP and/or of the $P_{insp}$ and/or of VT is output if $C_{WIN,global}$ is below the set threshold and $C_{LOSS,global}$ is above the set threshold; moreover, it is possible to establish findings that hyperexpansion can be observed, d. the recommendation to increase the PEEP and/or, if possible, reduce the $P_{insp}$ and/or the tidal volume is output if $C_{WIN,global}$ and $C_{LOSS,global}$ are above the set threshold; moreover, it is possible to establish findings that a hyperexpansion and the suspicion of a tidal recruitment can be observed.

If the inspiratory pressure $P_{insp}$ is reduced in the test phase T1 in relation to $P_{insp}$ of the reference phase R, a. the recommendation not to change the ventilation settings is output if $C_{WIN,global}$ and $C_{LOSS,global}$ are below the set threshold; moreover, it is possible to establish findings that no significant changes can be observed, b. the recommendation to reduce the PEEP and/or $P_{insp}$ and/or VT is output if $C_{WIN,global}$ is above the set threshold and $C_{LOSS,global}$ is below the set threshold; moreover, it is possible to establish findings that a weakening hyperexpansion can be observed, c. the recommendation to increase the PEEP is output if $C_{WIN,global}$ is below the set threshold and $C_{LOSS,global}$ is above the set threshold; moreover, it is possible to establish findings that the suspicion of a tidal recruitment can be observed, d. the recommendation to increase the PEEP and/or, if possible, reduce the $P_{insp}$ and/or the tidal volume is output if $C_{WIN,global}$ and $C_{LOSS,global}$ are above the set threshold; moreover, it is possible to establish findings that a weakening hyperexpansion and a suspicion of a tidal recruitment can be observed.

In some embodiments, the system 1 is configured to automatically carry out the recommendations and to adapt the ventilation settings in accordance with the evaluation and recommendation. Additionally, the system 1 can be configured, for example, to for example carry out a recommended recruitment maneuver and/or further ventilation maneuvers including measurements.

By way of example, it is also conceivable that the system 1 carries out a plurality of ventilation maneuvers and measurements with the same settings and generates and outputs a corresponding recommendation on the basis of an average or mean value of the results.

FIGS. 3 and 4 show an exemplary embodiment of the alphanumeric and visual output of the evaluation and recommendations of the system 1. In the embodiment of FIG. 3, a visual representation 14 of the selected maneuver setting (in this case an elevated PEEP in the test phase T1) can be seen in exemplary fashion in addition to the graphical output 15 of the evaluation of the characteristics $C_{WIN,global}$ (12), $C_{LOSS,global}$ (13) and $C_{R,Stat}$ (11) and the alphanumeric output of the recommendations 16. In addition thereto, findings can also be displayed in the field of the recommendations 16, which findings are established for example on the basis of the characteristics $C_{WIN,global}$ (12) and $C_{LOSS,global}$ (13) and for example automatically by the system (1). In the case shown, the evaluation of the characteristics is represented graphically as a bar chart. By way of example, the characteristic $C_{WIN,global}$ is above the set threshold and the characteristic $C_{LOSS,global}$ is below the set threshold. In the alphanumeric output of the recommendations 16, there should be a corresponding recommendation to increase the PEEP in the ventilation settings in order to obtain a more efficient and/or better ventilation.

FIG. 4 shows a further possible alphanumeric and graphical representation of the ventilation maneuver 14, of the evaluation of the characteristics 15 and of the recommendations 16 in exemplary fashion. By way of example, what is shown here is that both $C_{WIN,global}$ (12) and $C_{LOSS,global}$ (13) are above the set threshold, with the ventilation maneuver setting having provided an increased inspiratory pressure $P_{insp}$ for the test phase T1. The system therefore outputs, for example in the field for the recommendation 16, an alphanumeric text which says that the PEEP should be increased and, where possible, the $P_{insp}$ and/or the tidal volume should be reduced.

Figure 5:
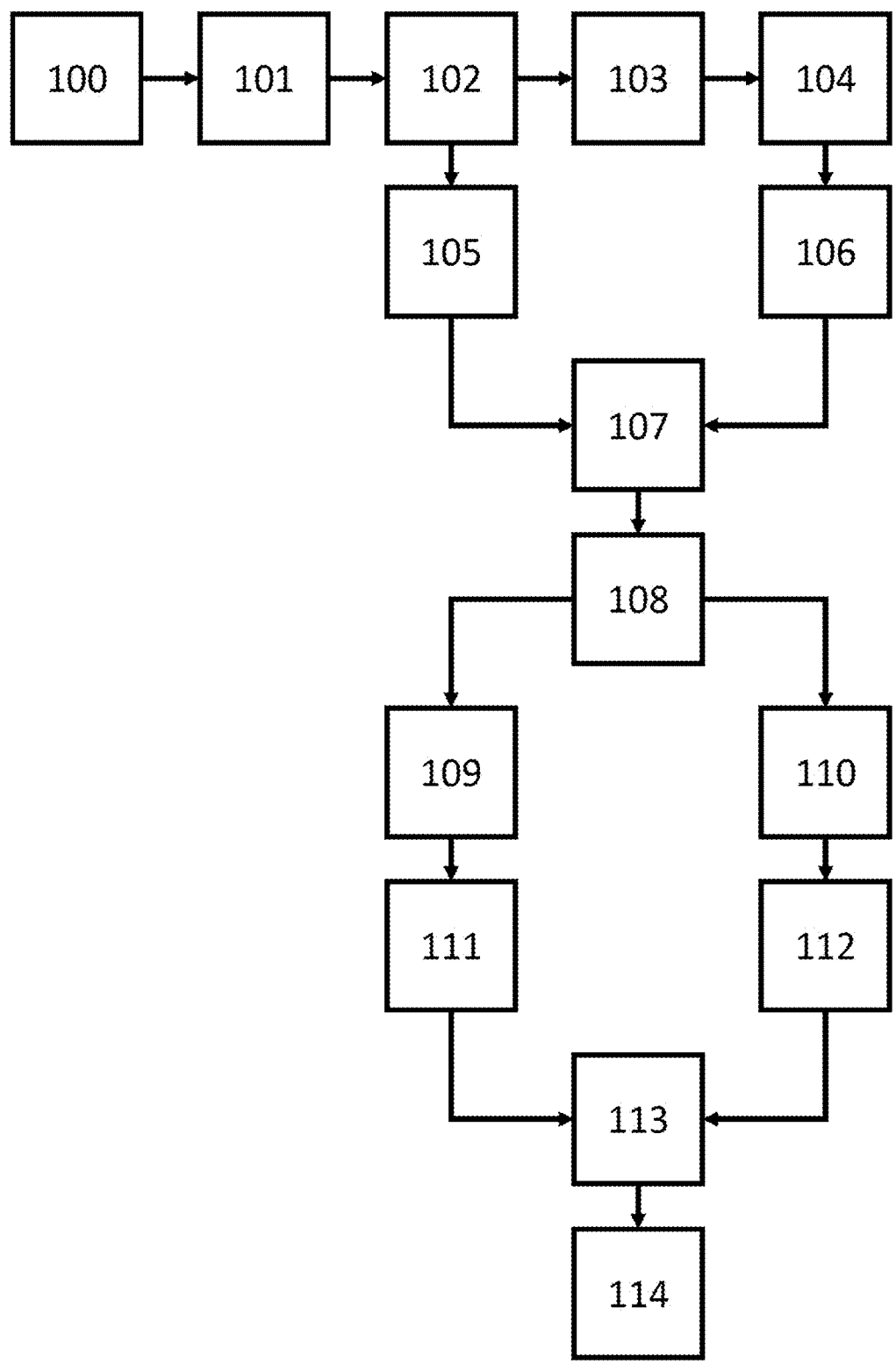
FIG. 5 shows a sequence of steps in exemplary and schematic fashion, which steps are carried out by the system in order, on the basis of the impedance values measured by the EIT measuring device and the ventilation maneuver, to generate recommendations in relation to the ventilation settings.

FIG. 5 shows, in exemplary and schematic fashion, a sequence of steps carried out by the system in order to generate recommendations in relation to the ventilation settings on the basis of the impedance values measured by the EIT measuring device and on the basis of the ventilation maneuver (cf. FIG. 2).

Here, the first step represents setting 100 the ventilation maneuver, wherein inter alia the ventilation setting in which the test phase T1 differs from the reference phase R and the size of the difference is chosen. While setting 100, it is also possible to choose the length of the inspiratory and expiratory hold maneuvers EH1, EH2, IH1, IH2 and the duration (for example in the form of number of breaths) of the respective reference phase R and test phase T1. The respective threshold for the characteristics $C_{WIN,global}$ and $C_{LOSS,global}$ can also be defined during the setting 100.

Setting 100 is followed by the first habituation step 101 of the being to the ventilation settings of the reference phase R. The measurement 102 in the reference phase R follows the habituation 101. Here, impedance values are recorded during the last breaths of the reference phase R.

The measurement step 102 is followed by the habituation step 103, which serves to habituate 103 the being to the ventilation settings of the test phase T1. The set change of the ventilation settings from the setting step 100 is applied during the test phase T1. The habituation step 103 is followed during the test phase T1 by the measurement step 104 for the impedance values. The measurement steps 102, 104 are each followed by the calculation steps 105, 106. In this case, the calculation 105 comprises the calculation of the characteristic $C_{R,n}$ for each pixel from the impedance values of the reference phase R1 measured during the measurement 102. In this case, the calculation 106 comprises the calculation of the characteristic $C_{T1,n}$ for each pixel from the impedance values of the test phase T1 measured during the measurement 104.

The subsequent comparison 107 comprises the comparison of the characteristics $C_{R,n}$ and $C_{T1,n}$. On the basis of the results of the comparison 107, the pixels and the characteristics $C_{R,n}$ and $C_{T1,n}$ connected therewith are classified 108 in the WIN or LOSS numerical groups.

Following the classification 108, the system 1 carries out the calculation steps 109, 110, the calculation 109 comprising the calculation of the characteristic $C_{WIN,global}$ and the calculation 110 comprising the calculation of the characteristic $C_{LOSS,global}$.

The characteristics $C_{WIN,global}$ and $C_{LOSS,global}$ are compared to the respective set thresholds in the following comparison steps 111, 112, wherein the characteristic $C_{WIN,global}$ is compared to the set threshold for $C_{WIN,global}$ in the comparison 111 and the characteristic $C_{LOSS,global}$ is compared to the set threshold for $C_{LOSS,global}$ in the comparison 112.

The system 1 carries out the evaluation step 113 after the comparison 111, 112. By way of example, during the evaluation 113, a graphical representation of the characteristics $C_{WIN,global}$ and $C_{LOSS,global}$ is generated and there is an evaluation whether any one or which of the characteristics $C_{WIN,global}$ and $C_{LOSS,global}$ are above the set thresholds. By way of example, the evaluation step 113 also comprises the establishment of findings on the basis of the characteristics $C_{WIN,global}$ (12) and $C_{LOSS,global}$ (13).

The recommendation step 114 is implemented on the basis of the evaluation from the evaluation step 113, the system 1 generating a recommendation in relation to the ventilation settings and optionally outputting this as an alphanumeric report in accordance with the setting of the ventilation maneuver and the characteristics $C_{WIN,global}$ and $C_{LOSS,global}$, or whether any one and which of the characteristics $C_{WIN,global}$ and $C_{LOSS,global}$ exceed the set thresholds.

Steps 101 to 114 are preferably carried out in fully automated fashion by the system 1 once the setting 100 has been completed. In some embodiments, the recommendation 114 is followed by an implementation step, for example, in which the system automatically applies the generated recommendations to the ventilation settings.

LIST OF REFERENCE SIGNS

1 System
2 Ventilator
3 EIT measuring device
4 Being
11 $C_{R,Stat}$
12 $C_{WIN,global}$
13 $C_{LOSS,global}$
14 Representation of a ventilation maneuver
15 Output of an evaluation
16 Output of a recommendation
21 Respiratory gas source
22 Control unit
23 Sensor unit
24 Memory unit
25 Preparation unit
26 Monitoring unit
27 Detection unit
31 Sensor device
32 Calculation and evaluation unit
100 Setting
101 Habituating
102 Measuring
103 Habituating
104 Measuring
105 Calculating
106 Calculating
107 Comparing
108 Classifying
109 Calculating
110 Calculating
111 Comparing
112 Comparing
113 Evaluating
114 Recommending
EH1 Expiratory hold maneuver, reference phase
EH2 Expiratory hold maneuver, test phase
G1 Habituation phase, reference phase
G2 Habituation phase, test phase
IH1 Inspiratory hold maneuver, reference phase
IH2 Inspiratory hold maneuver, test phase
M1 Measurement phase, reference phase
M2 Measurement phase, test phase P Pressure
PEEP1 PEEP, reference phase
PEEP2 PEEP, test phase
$P_{insp}1$ Inspiratory pressure, reference phase
$P_{insp}2$ Inspiratory pressure, test phase
R Reference phase
T1 Test phase
t Time

What is claimed is:

1. A system for ventilation of a being, wherein the system comprises at least one ventilator and at least one electro impedance tomography (EIT) measuring device, the ventilator comprising at least one controllable respiratory gas source and a programmable control unit for controlling the respiratory gas source, and the EIT measuring device comprising at least one sensor apparatus for measuring impedance values of at least one lung of the being and at least one calculation and evaluation unit, the system assigning impedance values measured by the at least one sensor apparatus to pixels n, and the programmable control unit being configured a. to specify ventilation settings in a reference phase (R) of the respiratory gas source, impedance values being recorded at at least one point in time in the reference phase (R) and a first characteristic $C_{R,n}$ being calculated from the recorded impedance values for each pixel n, and
   b. to specify ventilation settings in at least one test phase (T1) of the respiratory gas source following the reference phase (R), the ventilation settings differing from the ventilation settings of the reference phase (R) with respect to at least one ventilation setting, and impedance values being recorded at at least one point in time in the test phase (T1) and a second characteristic $C_{T1,n}$ being calculated from the recorded impedance values for each pixel n;

and wherein an end-expiratory hold maneuver (EH1, EH2) and an end-inspiratory hold maneuver (IH1, IH2) are carried out during a measurement phase (M1, M2), the measurement phase (M1, M2) comprising at least two breaths and the end-expiratory hold maneuver (EH1, EH2) being carried out during an expiration phase of a second-to-last breath and the end-inspiratory hold maneuver (IH1, IH2) being carried out during an inspiration phase of a last breath.

2. The system of claim 1, wherein at least one further test phase (Tm) follows the at least one test phase (T1), ventilation settings of each of the at least one further test phase (Tm) differing from the at least of one test phase (T1) and the reference phase (R) with respect to at least one ventilation setting, and the system recording impedance values at at least one point in time in each of the at least one further test phase (Tm) and calculating a second characteristic $C_{Tm,n}$ from the recorded impedance values for each pixel n.

3. The system of claim 2, wherein both the reference phase (R) and each test phase (T1, Tm) comprises at least two breaths, the reference phase (R) and each test phase (T1, Tm) being able to be subdivided into at least two subphases, at least one subphase representing a habituation phase (G1, G2) and at least one subphase representing the measurement phase (M1, M2).

4. The system of claim 1, wherein a positive end-expiratory pressure (PEEP) is applied during an expiration phase of each breath of the at least one test phase, and a inspiratory pressure $P_{insp}$ that is higher by a value $\Delta P$ or a tidal volume (VT) that is higher by an adjustable factor is applied during an inspiration phase of each breath of the at least one test phase.

5. A system for ventilation of a being, wherein the system comprises at least one ventilator and at least one electro impedance tomography (EIT) measuring device, the ventilator comprising at least one controllable respiratory gas source and a programmable control unit for controlling the respiratory gas source, and the EIT measuring device comprising at least one sensor apparatus for measuring impedance values of at least one lung of the being and at least one calculation and evaluation unit, the system assigning impedance values measured by the at least one sensor apparatus to pixels n, and the programmable control unit being configured a. to specify ventilation settings in a reference phase (R) of the respiratory gas source, impedance values being recorded at at least one point in time in the reference phase (R) and a first characteristic $C_{R,n}$ being calculated from the recorded impedance values for each pixel n, and
   b. to specify ventilation settings in at least one test phase (T1) of the respiratory gas source following the reference phase (R), the ventilation settings differing from the ventilation settings of the reference phase (R) with respect to at least one ventilation setting, and impedance values being recorded at at least one point in time in the test phase (T1) and a second characteristic $C_{T1,n}$ being calculated from the recorded impedance values for each pixel n;

and wherein the second characteristic $C_{T1,n}$ of each pixel n is compared to the first characteristic $C_{R,n}$ of the same pixel n, and the pixel n is assigned to one of at least two numerical groups, wherein a. pixels n for which $C_{T1,n}$ is greater than $C_{R,n}$ are assigned to a first numerical group WIN and
   b. pixels n for which $C_{T1,n}$ is less than $C_{R,n}$ are assigned to a second numerical group LOSS;

and wherein a characteristic is calculated from characteristics $C_{T1,n}$ and $C_{R,n}$ for each pixel n of a respective numerical group, wherein a. a characteristic $C_{WIN,n}$ is calculated for pixels n from the first numerical group WIN and
   b. a characteristic $C_{LOSS,n}$ is calculated for pixels n from the second numerical group LOSS and
   c. a characteristic $C_{WIN,global}$ is calculated for the first numerical group WIN with a sum of the characteristics $C_{WIN,n}$ and
   d. a characteristic $C_{LOSS,global}$ is calculated for the second numerical group LOSS with a sum of the characteristics $C_{LOSS,n}$.

6. The system of claim 5, wherein the system is configured to interpret the characteristics $C_{WIN,global}$ and $C_{LOSS,global}$ and to output a magnitude of the characteristics in alphanumeric and/or graphical fashion, with a ventilation setting by which the reference phase (R) and the test phase (T1) differ from one another being included in an interpretation of the characteristics $C_{WIN,global}$ and $C_{LOSS,global}$.

7. The system of claim 6, wherein a notification is generated on the basis of the interpretation of the characteristics $C_{WIN,global}$ and $C_{LOSS,global}$, the notification containing at least one recommendation in respect of ventilation settings and the notification being output in alphanumeric and/or graphical fashion.

8. The system of claim 7, wherein at least one of the ventilation settings in respect of which the notification contains at least one recommendation is at least one of a value of $\Delta P$ and/or a positive end-expiratory pressure (PEEP).

9. The system of claim 8, wherein, in the case of the at least one of the ventilation settings with a set threshold is the PEEP setting which is elevated in the test phase (T1) in relation to the reference phase (R), the at least one recommendation comprises
   a. the recommendation not to alter ventilation settings is output if $C_{WIN,global}$ and $C_{LOSS,global}$ are below the set threshold,
   b. the recommendation to increase PEEP is output if $C_{WIN,global}$ above the set threshold and $C_{LOSS,global}$ below the set threshold,
   c. the recommendation not to alter PEEP and consider a reduction in an inspiratory pressure $P_{insp}$ and/or an expiratory tidal volume VT, wherein the test phase with the reduced inspiratory pressure $P_{insp}$ should initially be set, is output if $C_{WIN,global}$ is below the set threshold and $C_{LOSS,global}$ above the set threshold,
   d. the recommendation to increase the PEEP and consider a reduction in the inspiratory pressure $P_{insp}$ and/or the expiratory tidal volume VT, wherein the test phase with the reduced inspiratory pressure $P_{insp}$ should initially be set, is output if $C_{WIN,global}$ and $C_{LOSS,global}$ are above a set threshold,
and/or, in the case of the at least one of the ventilation settings with the set threshold is the PEEP setting which is reduced in the test phase (T1) in relation to the reference phase (R),
   e. the recommendation not to alter ventilation settings and/or the recommendation to reduce the PEEP is output if $C_{WIN,global}$ and $C_{LOSS,global}$ are below the set threshold,
   f. the recommendation to reduce the PEEP is output if $C_{WIN,global}$ is above a set threshold and $C_{LOSS,global}$ is below the set threshold,
   g. the recommendation not to alter the PEEP and/or to increase the latter and to consider a recruitment maneuver is output $C_{WIN,global}$ is below the set threshold and $C_{LOSS,global}$ is above the set threshold,
   h. the recommendation not to alter the PEEP and to consider the recruitment maneuver and, where possible, to reduce the $P_{insp}$ and/or the VT is output if $C_{WIN,global}$ and Cross, global are above the set threshold.

10. The system of claim 7, wherein, in the case of the at least one of the ventilation settings with a set threshold is an inspiratory pressure $P_{insp}$ and/or an expiratory tidal volume VT setting, which is elevated in the test phase (T1) in relation to the reference phase (R), the at least one recommendation comprises
   a. the recommendation not to alter ventilation settings is output if $C_{WIN,global}$ and $C_{LOSS,global}$ are below the set threshold,
   b. the recommendation to increase a positive end-expiratory pressure (PEEP) is output if $C_{WIN,global}$ is above the set threshold and $C_{LOSS,global}$ is below the set threshold,
   c. the recommendation to reduce the PEEP and/or of the $P_{insp}$ and/or of the VT is output if $C_{WIN,global}$ is below the set threshold and $C_{LOSS,global}$ is above the set threshold,
   d. the recommendation to increase the PEEP and/or, where possible, to reduce the $P_{insp}$ and/or the VT is output if $C_{WIN,global}$ and $C_{LOSS,global}$ are above the set threshold,
and/or, in the case of the $P_{insp}$ and/or the VT setting which is reduced in the test phase (T1) in relation to the reference phase (R),
   e. the recommendation not to alter ventilation settings is output if $C_{WIN,global}$ and $C_{LOSS,global}$ are below a set threshold,
   f. the recommendation to reduce the PEEP and/or the $P_{insp}$ and/or the VT is output if $C_{WIN,global}$ is above the set threshold and $C_{LOSS,global}$ is below the set threshold,
   g. the recommendation to increase the PEEP is output if $C_{WIN,global}$ is below the set threshold and $C_{LOSS,global}$ is above the set threshold,
   h. the recommendation to increase the PEEP and, where possible, to reduce the $P_{insp}$ and/or the VT is output $C_{WIN,global}$ and $C_{LOSS,global}$ are above the set threshold.

11. The system of claim 7, wherein the notification also contains at least one finding in addition to the at least one recommendation.

12. The system of claim 7, wherein a control device is configured to automatically carry out the output of the at least one recommendation and to implement corresponding ventilation settings.

13. The system of claim 5, wherein findings are established on the basis of an interpretation of $C_{WIN,global}$ and $C_{LOSS,global}$.

14. A method for the ventilation of a being by means of a system which comprises at least one ventilator and at least one EIT measuring device, wherein the method comprises the following steps:
   a. habituating the being to ventilation settings in a reference phase R,
   b. measuring impedances of a lung of the being during the reference phase R by the at least one EIT measuring device,
   c. habituating the being to ventilation settings in a test phase T1,
   d. measuring impedances of the lung of the being during the test phase T1 by the at least one EIT measuring device,
   e. calculating characteristics $C_{R,n}$ and $C_{T1,n}$ from impedance values from measurement steps b. and d.,
   f. comparing characteristics $C_{R,n}$ and $C_{T1,n}$,
   g. classifying the characteristics $C_{R,n}$ and $C_{T1,n}$ in numerical groups WIN and LOSS,
   h. calculating characteristics $C_{WIN,global}$ and $C_{LOSS,global}$,
   i. comparing the characteristics $C_{WIN,global}$ and $C_{LOSS,global}$ to thresholds,
   j. an evaluation at least comprising a generation of a graphical representation of $C_{WIN,global}$ and $C_{LOSS,global}$ and the evaluation optionally comprising an establishment of findings taking into account the characteristics $C_{WIN,global}$ and $C_{LOSS,global}$,
   k. a recommendation at least comprising a generation of an alphanumeric output of recommendations in respect of the ventilation settings.

* * * * *